United States Patent [19]

Richards

[11] 3,710,050
[45] Jan. 9, 1973

[54] ELECTRONIC PRESSURE SENSITIVE SWITCH

[76] Inventor: Arthur J. Richards, 4240 Yorkshire Road, Detroit, Mich. 48224

[22] Filed: Sept. 14, 1970

[21] Appl. No.: 72,031

[52] U.S. Cl. ................200/61.43, 349/28, 180/111
[51] Int. Cl. ..............................................H01h 3/16
[58] Field of Search ........338/99, 100, 114; 200/152, 200/152.9, 61.43; 180/111, 112, 113; 349/26, 27, 28

[56] References Cited

UNITED STATES PATENTS

| | | | |
|---|---|---|---|
| 3,315,050 | 4/1967 | Miller | 200/61.43 |
| 740,787 | 10/1903 | Vetter | 338/114 X |
| 3,465,476 | 9/1969 | Rayner et al. | 49/28 |
| 3,386,067 | 5/1968 | Costanzo | 338/114 X |

Primary Examiner—Herman J. Hohauser
Attorney—Whittemore, Hulbert & Belknap

[57] ABSTRACT

A pressure sensitive electronic switching device comprised of a flexible tubular member having a pair of electrical conductors spaced apart in the tube. The conductors are connected at one end to an electric circuit having a source of electrical power. A powdered semi conducting material occupies the space in the tube between the conductors. When a force is applied against the tube moving one conductor toward the other the powdered material is compressed. Before being compressed the material has a high resistance to the flow of electric current between the conductors. As the material is compressed the resistance to the flow of current decreases. When the current flow reaches a predetermined value a relay or other current sensitive device in the electric circuit connected to the conductors is actuated.

8 Claims, 5 Drawing Figures

PATENTED JAN 9 1973 3,710,050
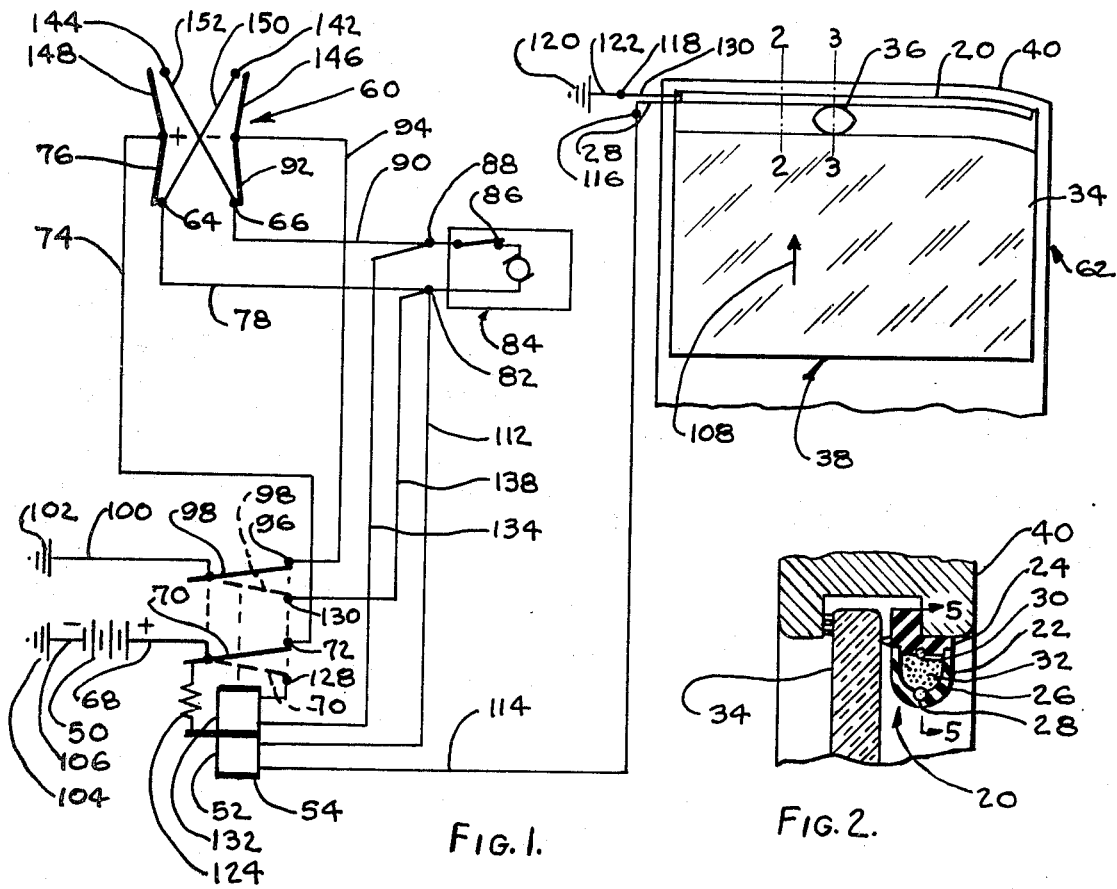
FIG. 1.
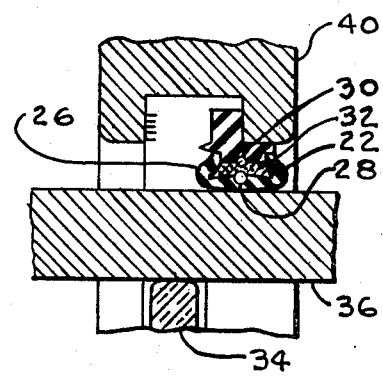
FIG. 2.
FIG. 3.
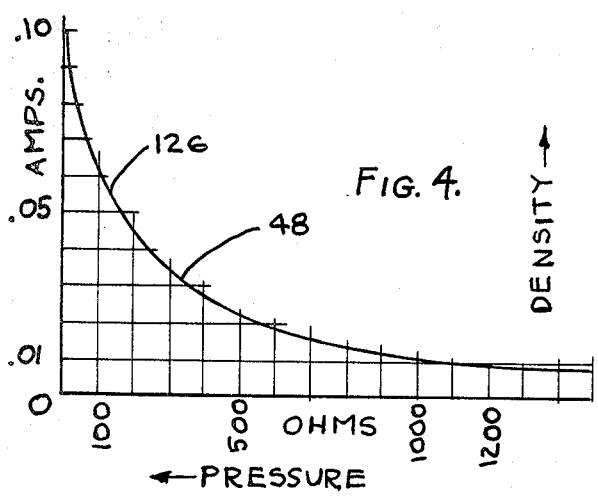
FIG. 4.
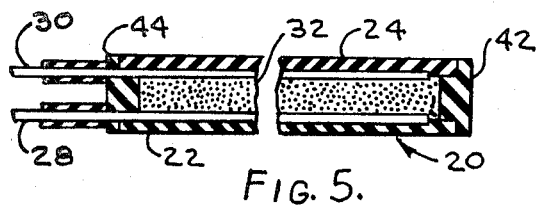
FIG. 5.
INVENTOR
Arthur J. Richards

ELECTRONIC PRESSURE SENSITIVE SWITCH

The invention is disclosed in operation with an electric motor driven window operator of the type used in automotive vehicles. The tubular member is mounted at the top of the window opening adjacent to the channel that receives the pane of glass. When the window is being closed by the electric operator and an object is between the pane of glass and the top of the window opening, the power of the operator forces the object against the tubular member. The semi conducting material becomes compressed allowing electric current to flow in the circuit connected to the device, actuating a relay. The relay functions to reverse the direction of rotation of the electric motor to lower the window and release the object.

An object of the present invention is to provide an electronic switching device that is sensitive to pressure with the pressure sensitive element being a powdered semi conducting material.

Another object of the present invention is to provide a pressure sensitive electronic switching device with the pressure sensitive element being a powdered semi conducting material, the material before being compressed having a high resistance to the flow of electric current with the resistance of the material decreasing as the material is compressed by a force acting against it.

Another object of the invention is to provide an electric circuit comprising a source of electric power, a pressure sensitive element and a current actuated device, the current flowing in the circuit being responsive to a pressure applied against the pressure sensitive element and the current actuated device being actuated at a predetermined value of current flowing in the circuit.

Another object of the invention is to provide an electric circuit comprising a source of electric power, a pressure sensitive switching device and a relay, the current flowing in the circuit being responsive to a pressure applied to the switch, the pressure sensitive element of the switch being a powdered semi conducting material. As the semi conducting material is compressed the flow of current in the circuit increases to a predetermined value and actuates the relay. The relay functions to arrest the pressure being applied against the switch.

Other objects and features of the invention will become apparent as the description proceeds especially when taken in conjunction with the accompanying drawing.

FIG. 1 is a diagram of the electronic switching device as applied to an electric powered window operator of the automotive type and connected to the electric circuit operating the window.

FIG. 2 is an enlarged sectional view through the line 2 — 2 of FIG. 1 showing the window in a closed position.

FIG. 3 is an enlarged sectional view through line 3 — 3 of FIG. 1 showing the pane of glass forcing an object against the pressure sensitive switch.

FIG. 4 is a diagram showing the curve obtained by plotting the electric current values against resistance values measured across the conductors of the switch with the switch connected in the circuit of FIG. 1 and as the pressure against the object forces one of the conductors toward the other as shown in FIG. 3.

FIG. 5 is a sectional view through line 5 — 5 of FIG. 2 showing both ends of the switch.

Refering to the drawings the numeral 20 FIGS. 1 and 2 generally indicate the switching device comprised of portions 22 and 24 joined together to form the tubular member 26. The portions 22 and 24 are molded or extruded of rubber or other non conducting flexible material with portion 22 having a groove to receive the conductor of electric current 28 and the portion 24 having a groove to receive the conductor 30. The material of portion 22 is flexible to allow conductor 28 to be moved toward Conductor 30 and compress the powdered semi conducting material 32 when the pane of glass 34 forces an object 36 against the member 26 as shown in FIG. 3. The location of the switch 20 at the top of the window opening generally indicated by the numeral 38 is preferably toward the interior of the vehicle that the device is installed in. The numeral 40 indicates a portion of the top of the window opening. The conductor 28 is preferably made of resilient material having spring temper and is held in place in the groove during flexing of the portion 22. When the force applied to the exterior of member 26 is relieved, the resilient conductor resumes the form it had before the application of force, thus assisting in restoration of the deformed channel-shaped member 26 to its original form as illustrated in FIG. 2. The portion 24 need be only flexible enough to retain the conductor 30 in the groove and follow any contour along the length of the window opening. The view of FIG. 5 along the length of the tube shows the caps 42 and 44 closing each end of the tube. Conductors 28 and 30 extend through cap 44 and are insulated exterior of the tube. Along the interior of the tube the conductors present a conducting surface where exposed to the semi conducting material 32.

The semi conducting material 32 if of a type having a high resistance to the flow of electric current when in powder form and of a low density and a low resistance to the flow of current when in powdered form and compressed to a high density. The measure of density is expressed as the weight per unit volume. The mineral Magnetite $Fe_3O_4$ has these characteristics. In pure crystal form Magnetite has a resistivity of approximately 0.005 ohms/centimeter, resistivity being equal to the resistance of a sample one centimeter in length and having a cross sectional area of one square centimeter. The crystals can be ball milled into micro crystalline powders. In powdered form the resistivity varies with the compressed density. The density of the powders compressed with equal pressure varies with the fineness of the powder particles measured in microns. The compressed resistivity of the powdered Magnetite varies with the purity of the crystals and with the addition of other powdered materials added to the powdered Magnetite as will later be described.

The curve 48 of FIG. 4 illustrates current resistance characteristics of a sample of powdered Magnetite used with the present device in the circuit of FIG. 1. The battery power supply 50 is approximately 12.5 volts. The resistance of the coil 52 of the double pole double throw relay 54 is 120 ohms. The semi conducting material 32 is placed in the tube with an initial density having a resistance of approximately 1200 ohms. allowing a current of approximately 0.009 amperes to flow between conductors 28 and 30. At lower densities the material has higher resistances as shown by the curve. The curve also represents the pressure density characteristics of the material.

The electric window operator functions to close the window by moving the pane of glass 34 toward the top of the window opening. The top of the glass encounters the object 36 protruding through the opening, forcing the object against the portion 22 of the tube, moving conductor 28 towards conductor 30, flexing portion 22 and compressing the material 32 as shown in FIG. 3. The resistance of the material decreases until a minimum value of approximately 1.5 ohms is reached across the conductors allowing approximately 0.103 amperes of current to flow between the conductors. The relay 54 can be adjusted to be actuated at a predetermined value of current flowing in the circuit that includes coil 52 and the switch 20. Preferably the value of current selected be represented by a point along the steeper portion 126 of the curve 48 that meets the sensitivity and pressure requirements of the application. When the relay is actuated the glass 34 moves away from the object 36 in a manner to be described.

A diagram of the present invention connected to the electrical circuit of the electric window operator of the type used in motor vehicles is shown in FIG. 1. Numeral 60 generally indicates a double pole double throw switch controlling the operation of the window indicated by the numeral 62. As shown in the diagram, contacts 64 and 66 of the switch are closed completing a circuit from the battery 50 through conductor 68, relay arm 70, closed contacts at 72, conductor 74, switch arm 76, contacts 64, conductor 78, to the terminal 82 of the motor indicated by the numeral 84. The closed contacts 86 are for a purpose later to be described. The terminal 82 of the motor is at the positive side of the battery 50. The circuit is completed from the terminal 88 of the motor through conductor 90, closed contacts 66 of the switch 60, switch arm 92, conductor 94, closed contacts 96, relay arm 98, conductor 100, to ground indicated at 102. The terminal 88 of the motor is at the negative side of the battery 50 that is grounded at 104 through line 106. With the circuit completed the motor operates to move the pane of glass 34 in the direction of the arrow 108 to close the window. As illustrated in FIG. 3 the pane of glass forces the object 36, that is between the top of the glass and the top of the window opening, against the portion 22 of the switch 20 moving conductor 28 towards conductor 30 and compressing the semi conducting material 32.

The switch 20 is connected to the window operator circuit at the positive terminal 82 of the motor through conductor 112, relay coil 52, conductor 114 to conductor 28 at the switch terminal 116. The circuit continues through the semi conducting material 32 to conductor 30. The terminal 118 of conductor 30 is connected to ground at 120 through conductor 122. The relay 54 is shown in the normal non actuated position with the spring 124 holding the contacts at 72 and 96 closed. The amount of current flowing through the coil 52 and switch 20 increases as the semi conducting material 32 becomes compressed by the pane of glass 34 forcing the object 36 against the switch. By adjusting the tension of the spring 124 the amount of current necessary to actuate relay 54 can be selected. When the selected amount of current flows in coil 52 the relay 54 becomes actuated opening the contacts at 72 and 96 and closing contacts at 128 and 130 as shown by the dotted lines. Opening the contacts at 72 and 96 disconnects switch 60 from the motor 84. Power from the positive side of battery 50 is now through conductor 68, arm 70 now closing contacts at 128, relay coil 132, conductor 134 to the motor terminal 88. The circuit continues through contacts 86, conductor 138 connected to the motor at terminal 82, relay arm 98 now closing contacts at 130 and to ground through conductor 100.

The terminals 82 and 88 of the motor previously connected to the positive and negative sides of the battery respectively, become connected to the negative and positive sides of the battery, reversing the polarity and changing the direction of rotation of the motor. When the rotation of the motor changes direction the pane of glass 34 moves opposite to the direction of the arrow 108, relieving the pressure on the object 36 and opening the window. With the terminal 82 at the negative side of the battery through ground at 102, current stops flowing through conductor 112 to the circuit of relay coil 52 and switch 20 that is also grounded at 120. Current flowing in the coil 132 holds relay 54 energized and the contacts at 128 and 130 closed. The tubular member 26 of the switch returns to the position shown in FIG. 2.

When the window comes to a fully opened position the motor stalls and stops rotating. The contacts 86 of the motor are actuated by a heat responsive bi metal element or other overload device that is adjusted to open at a predetermined time interval after the motor stalls. When the contacts at 86 open, current to the motor stops flowing through coil 132 of the relay, the relay becomes deenergized and the spring 124 returns the contacts at 72 and 96 to the normally closed position.

The motor can also be reversed to open the window by use of the switch 60. Opening the contacts at 64 and 66 and closing the contacts at 142 and 144 by switch arms 146 and 148 respectively results in reversing the polarity of the motor through cross connected conductors 150 and 152. The switch 60 is preferably of the momentary contact type, the contacts at 64 and 66 or 142 and 144 being held closed with manual pressure. When the pressure is relieved the switch returns to a normal position with the contacts at 64, 66, 142 and 144 all open.

The invention has been shown and described with reference to a prefered application and embodiment. The semi Conducting material 32 can also be a mixture of powdered rubber and powdered Magnetite. The powdered rubber preferably is obtained from rubber having a carbon black content giving a medium durometer hardness to the rubber. An addition of approximately 20 to 50 percent by volume of powdered rubber to powdered Magnetite provides greater resiliency to the semi conducting material allowing the material to return faster to the position of low density and high resistance after being compressed.

The addition of powdered rubber to the powdered Magnetite varies the resistivity of the semi conducting material. For example powdered Magnetite compressed to a density having a resistivity of 1.4 ohms/cm increased in resistivity to 3.1 ohms/cm. with the addition of approximately 25 percent by volume of powdered rubber. Other powdered materials can be added to powdered Magnetite to change the characteristics of the material. For example powdered pure Lead Sulphide PbS, also known as Galena, can be added to powdered Magnetite to vary the resistivity of the material.

The shape of the curve 48 representing the pressure density characteristics of the semi conducting material is not substantially altered by the addition of other powdered materials to powdered Magnetite. By the addition of other powdered materials to powdered Magnetite, current resistance values of the semi conducting material can be obtained to suit the requirements of the applications the switching device of the present invention can be used for.

The switch 20 of the present invention can be fabricated with the use of a mold, the shape of the mold providing a cross sectional and longitudinal contour to the switch to fit the top of the window opening of a vehicle the switch may be installed in. With the conductors 28 and 30 and semi conducting material 32 inside the member 26 and the end pieces 42 and 44 in place in the mold, heat and pressure is applied to the mold. A flexible unitary structure is produced.

Modifications and variations of the invention may be made to suit other applications without departing from the scope of the appended claims.

What I claim as my invention is:

1. A pressure sensitive electric switching device comprising, an elongated flexible tube, a pair of electric conductors extending longitudinally of and spaced apart in said tube, said conductors being connected to an electric circuit that includes a source of electric power and a current actuated device, a loose powdered micro crystalline semi-conducting material filling said tube and completing the circuit between the conductors, said material having an initial density limiting the flow of current in said circuit to allow the current actuated device to remain inactive, and having a compressed density between said conductors resulting from a predetermined force acting against the exterior of the flexible tube at one side thereof and at any point along the length thereof allowing a current to flow in said circuit to actuate the current actuated device, means for applying a force to one side of said tube comprising a vehicle window movable across a window opening and an electric motor connected to the said window and controlled by said current actuated device, said tube being positioned at the top of the window opening in position at the side of the window in closed position such that the upper edge of said window normally moves past the tube in closing, and such that an article in the window opening above the upper edge of the window is engaged by the upper edge of said window and is moved thereby to apply force to said tube, said current actuated device being operable to arrest the operation of the means for applying force to one side of said tube when the semi-conducting powdered material is compressed to a density allowing a current to flow in the circuit to actuate said current actuated device.

2. A device as defined in claim 1 in which the device is positioned at the inside of the window when said window is in closed position.

3. A device as defined in claim 2 in which aid current actuated device is a relay, and a switch actuated by said relay connected to control operation of said motor.

4. A device as defined in claim 3 in which said switch is a reversing switch operable upon actuation of said relay to reverse said motor and to move said window in an opening direction.

5. A vehicle window movable across a window opening and having a reversible electric motor operatively connected thereto to open and close said window, an elongated pressure responsive switching device operable by pressure applied to said device anywhere along its length, said device extending across the top of the window opening in position at the side of the window in closed position such that the upper edge of the window normally moves past the elongated device in closing and such that an article interposed in the window opening between the upper edge of the window and said elongated device is engaged by the upper edge of said window and is moved thereby to apply force to a portion of said elongated device, switch means operatively connected to said motor, a relay connected to said switch means, means connecting said elongated device to said relay and operable upon application of a predetermined pressure anywhere along the length of said elongated device to actuate said relay to stop said motor to terminate closing movement of said window.

6. Structure as defined in claim 5 in which said elongated device comprises a flexible laterally compressible tube, and conductors extending longitudinally within said tube at opposite sides thereof.

7. Structure as defined in claim 6 in which said elongated device is located at the inside of the window opening.

8. Structure as defined in claim 6 in which said switch means is a reversing switch operable by said relay to reverse said motor upon application of a predetermined pressure to said tube to move said window in an opening direction.

* * * * *